United States Patent [19]

Ermacora

[11] Patent Number: 4,986,064

[45] Date of Patent: Jan. 22, 1991

[54] HARVESTING MACHINE

[75] Inventor: Rino Ermacora, Saverne, France

[73] Assignee: Kuhn S.A., Saverne Cedex, France

[21] Appl. No.: 270,455

[22] Filed: Nov. 7, 1988

Related U.S. Application Data

[63] Continuation of Ser. No. 117,928, Nov. 4, 1987, abandoned, which is a continuation of Ser. No. 755,783, Jul. 17, 1985, abandoned.

[30] Foreign Application Priority Data

Jul. 19, 1984 [FR] France ................. 84 11626

[51] Int. Cl.$^5$ ............................................. A01B 73/00
[52] U.S. Cl. ................................... 56/228; 280/415.1
[58] Field of Search .................. 56/228; 280/415 R; 172/240, 245

[56] References Cited

U.S. PATENT DOCUMENTS

| | | | |
|---|---|---|---|
| 335,950 | 2/1886 | Osborne | 56/228 |
| 576,406 | 2/1897 | Latimer et al. | 56/228 |
| 2,806,707 | 9/1957 | Christie . | |
| 2,833,105 | 5/1958 | Naery | 56/228 |
| 3,142,144 | 7/1964 | Ronning . | |
| 3,524,306 | 8/1970 | Reber . | |
| 3,581,482 | 6/1971 | Reber . | |
| 3,604,185 | 9/1971 | Reber . | |
| 3,635,495 | 1/1972 | Orendorff . | |
| 3,708,966 | 1/1973 | Reber . | |
| 3,721,461 | 3/1973 | Nelsen et al. | 56/228 |
| 3,916,725 | 11/1975 | Reber . | |
| 3,919,831 | 11/1975 | Hall et al. | 56/228 |
| 4,034,623 | 7/1977 | Boone et al. | 56/228 |
| 4,145,865 | 3/1979 | Werner . | |
| 4,166,350 | 9/1979 | Werner . | |
| 4,212,147 | 7/1980 | Werner . | |
| 4,244,163 | 1/1981 | Gantzer et al. . | |
| 4,299,078 | 11/1981 | Werner . | |
| 4,304,088 | 12/1981 | Werner . | |
| 4,340,239 | 7/1982 | Shoup . | |
| 4,343,138 | 8/1982 | Neuerburg . | |
| 4,365,462 | 12/1982 | Werner . | |
| 4,426,828 | 1/1984 | Neuerburg . | |
| 4,428,185 | 1/1984 | Toillie et al. . | |
| 4,442,662 | 4/1984 | Jennings . | |
| 4,443,998 | 4/1984 | Neuerburg . | |
| 4,452,034 | 6/1984 | Neuerburg . | |
| 4,557,104 | 12/1985 | Toillie et al. . | |

FOREIGN PATENT DOCUMENTS

| | | | |
|---|---|---|---|
| 514873 | 1/1981 | Australia . | |
| 2265260 | 10/1975 | France . | |
| 2079573 | 1/1982 | United Kingdom | 56/121.4 |

*Primary Examiner*—Kenneth J. Dorner
*Assistant Examiner*—J. Hakomaki
*Attorney, Agent, or Firm*—Oblon, Spivak, McClelland, Maier & Neustadt

[57] ABSTRACT

A novel harvesting machine is usable with a novel method for transformation from an operating position to a transport position. The machine has a set of work wheels and a set of transport wheels which extend on transverse axes. The transport wheels extend substantially parallel to, and on both sides of the longitudinal axis of the body of the machine. When the work wheels are lowered the resulting raising of the body of the machine permits the transport wheels to be lowered. Subsequently, the body can be lowered onto the transport wheels and the work wheels raised. In a subsequent operation the tongue of the machine is pivoted relative to the body into a transport position parallel to the longitudinal axis of the body. An additional connecting element may be provided for supporting the body when in the transport position.

22 Claims, 4 Drawing Sheets

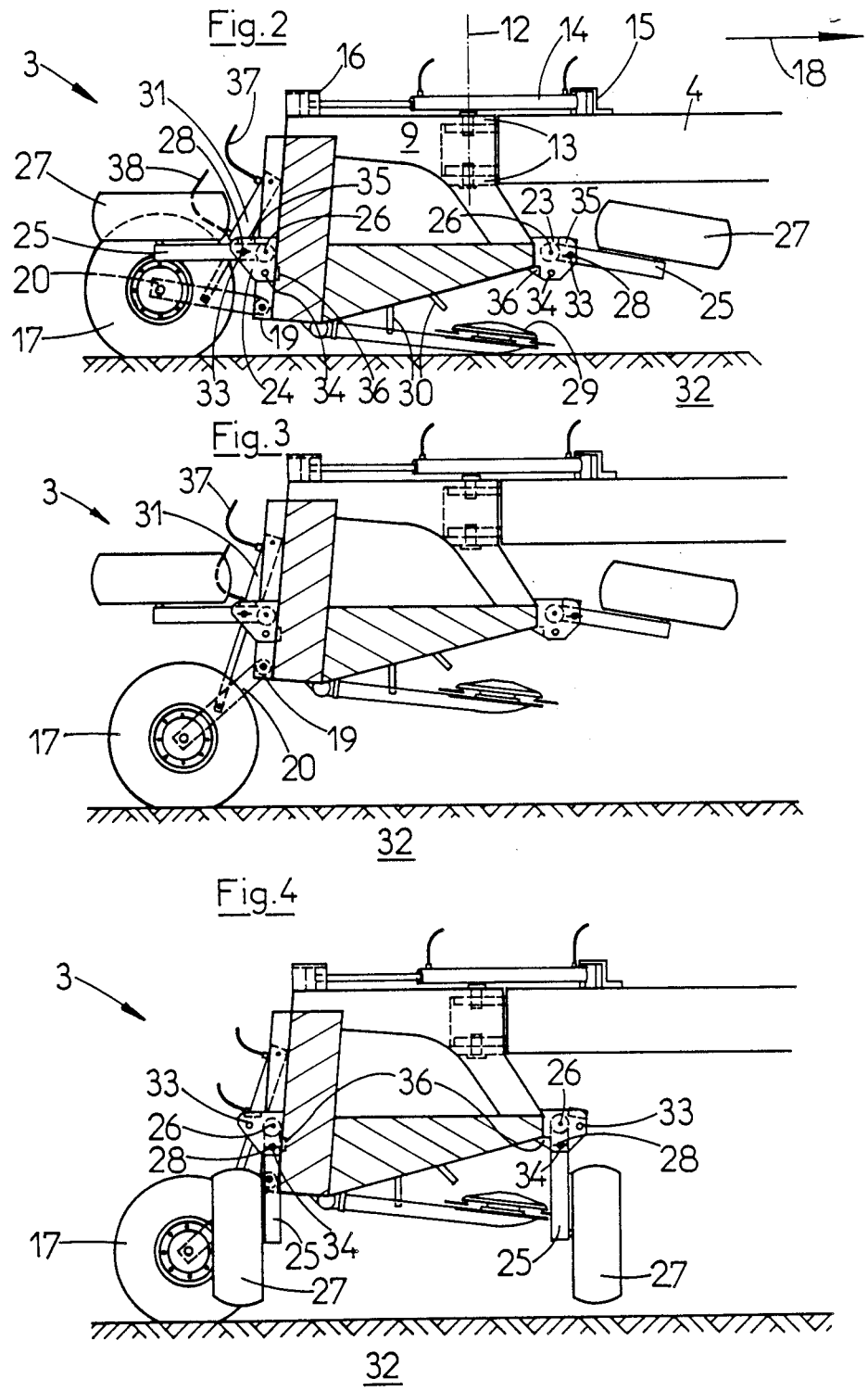

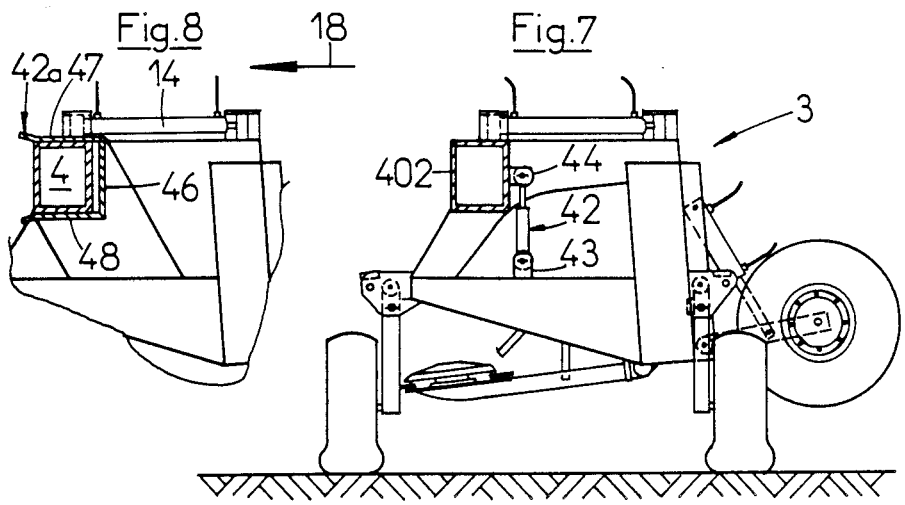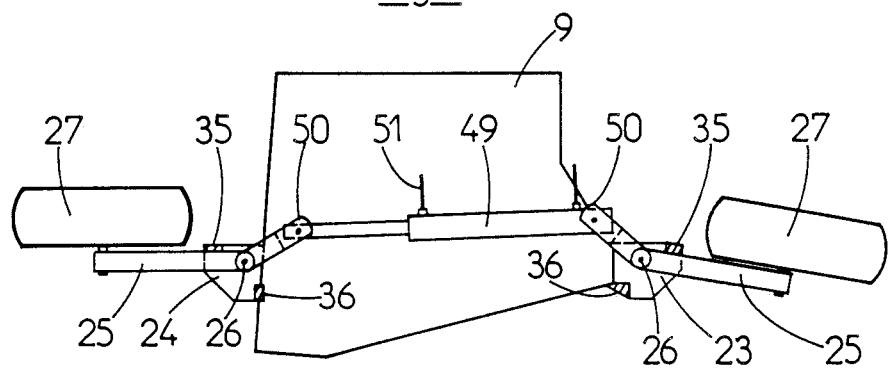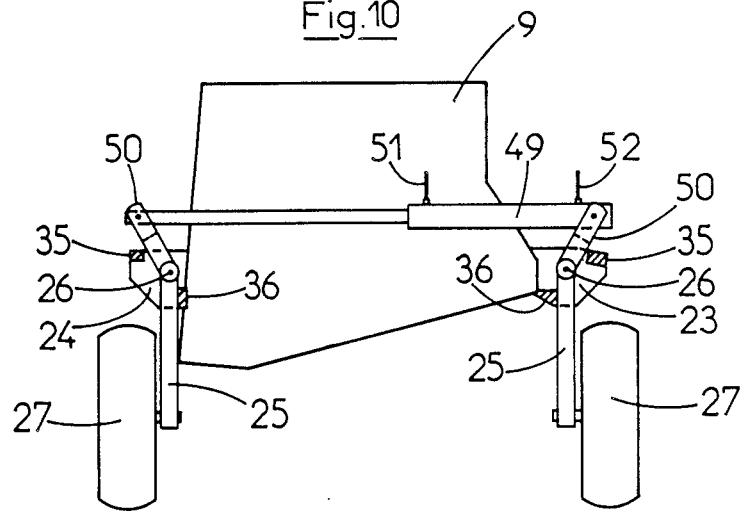

HARVESTING MACHINE

This application is a continuation of application Ser. No. 117,928, filed on Nov. 4, 1987, now abandoned.

This application is a continuation of application Ser. No. 06/755,783, filed on July 17, 1985, now abandoned.

BACKGROUND OF THE INVENTION

1. Field of the Invention

This invention relates to a harvesting machine using a process for the transformation of said harvesting machine to bring it from an operating or working position in which the longitudinal axis of its body extends crosswise to the working direction to a transport position in which the longitudinal axis of its body extends approximately parallel to the transport direction.

2. Discussion of the Background

Transformation processes are known which require a large number of operations and particularly operations during which it is necessary to arrange additional elements which must be removed from the machine during operation, such as, for example, a transport carriage, special tongue, etc.

Other processes require total or partial removal of a certain number of elements of the machine, such as the working wheels, for example. In this latter case, it is necessary to successively unload said wheels to be able to perform the various removals or changes of position of the working wheels. In addition, these removals require tools which the user does not always have at hand.

All these transformation processes require a relatively long transformation time.

A process is also known in which all the working wheels are used as transport wheels without removal. In this process, the wheel and axle set can pivot around a vertical axis from a position where the axis of rotation of the wheels extends parallel to the longitudinal axis of the machine body to a position where the axis of rotation of the wheels extends perpendicular to the longitudinal axis of the machine body. During operation, the wheels are behind the machine body, while during transport one wheel is under the machine body. To make this latter wheel go under the machine body, the machine body must be able to move considerably upward. This requires rather complex lifting means. Moreover, during transport, the center of gravity of the machine body is relatively far from the ground, so that stability problems can arise. In addition, since one of the wheels is under the machine body, the wheels have very different loads during transport. Finally, during transport, the upright post by which the tongue is connected to the body is subject to very high stresses due to the swaying of the body during transport.

SUMMARY OF THE INVENTION

This invention has as its object the elimination of the drawbacks of the various machines of the prior art.

For this purpose, the harvesting machine according to the invention uses the process which provides the following operations: The machine body, which rests on at least two working wheels, is lifted to bring it to a position off the ground. Transport wheels are then put in place which are different from the working wheels and extend approximately on both sides of the machine body and turn in planes approximately parallel to the longitudinal axis of the machine body. At least a part of the weight of the machine is then transferred from the working wheels to the transport wheels. Finally, a tongue is made to pivot in relation to the machine body from an operating position to a transport position. Finally, an additional connecting means is positioned between the tongue and the machine body, when the tongue is in the transport position. This additional connection is made so that during transport the machine body cannot sway with respect to the tongue.

With this process, the transformation of a harvesting machine to bring it from an operating position to a transport position and vice versa is very simple and very quick. This transformation can be performed by one person.

In a preferred process, the transfer of at least a part of the weight of the machine from the working wheels to the transport wheels is done by lifting the working wheels.

In the invention, it is possible for the lifting operation to bring the machine body to a raised position and the operation of putting the transport wheels in place to be performed almost simultaneously.

Likewise, in the invention it is also possible for the step of transferring at least a part of the weight of the machine from the working wheels to the transport wheels and the step of pivoting the tongue in relation to the machine body from the working position to the transport position to be performed almost simultaneously. The harvesting machine according to the invention possesses in combination the following: Working wheels connected to the machine body by means that allow a modification of the position of said working wheels in relation to the machine body by a control device, transport wheels different from the working wheels, connected to the machine and able to be brought from a position off the ground to a position where they are in contact with said ground, a tongue connected to the harvest machine body by a joint with an upwardly extending axis and able to pivot between a working position and a transport position, and additional connecting means positioned between the tongue and the machine body, when the tongue is in the transport position.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 2 shows a side view partially in section along plane II—II of FIG. 1;

FIG. 3 shows the first step of the transformation process of the machine according to the invention;

FIG. 4 shows the second step of the transformation process of the machine according to the invention;

FIG. 7 shows a side view partially in section along arrow VII of FIG. 6;

FIG. 8 shows another embodiment of an additional connecting means between the tongue and body of the harvesting machine;

FIG. 9 shows another technique of maneuvering the transport wheels, which are in raised rest position; and FIG. 10 shows the technique of maneuvering the transport wheels as in FIG. 9, which are in a transport position.

DETAILED DESCRIPTION OF THE PREFERRED EMBODIMENTS

Figure 1:
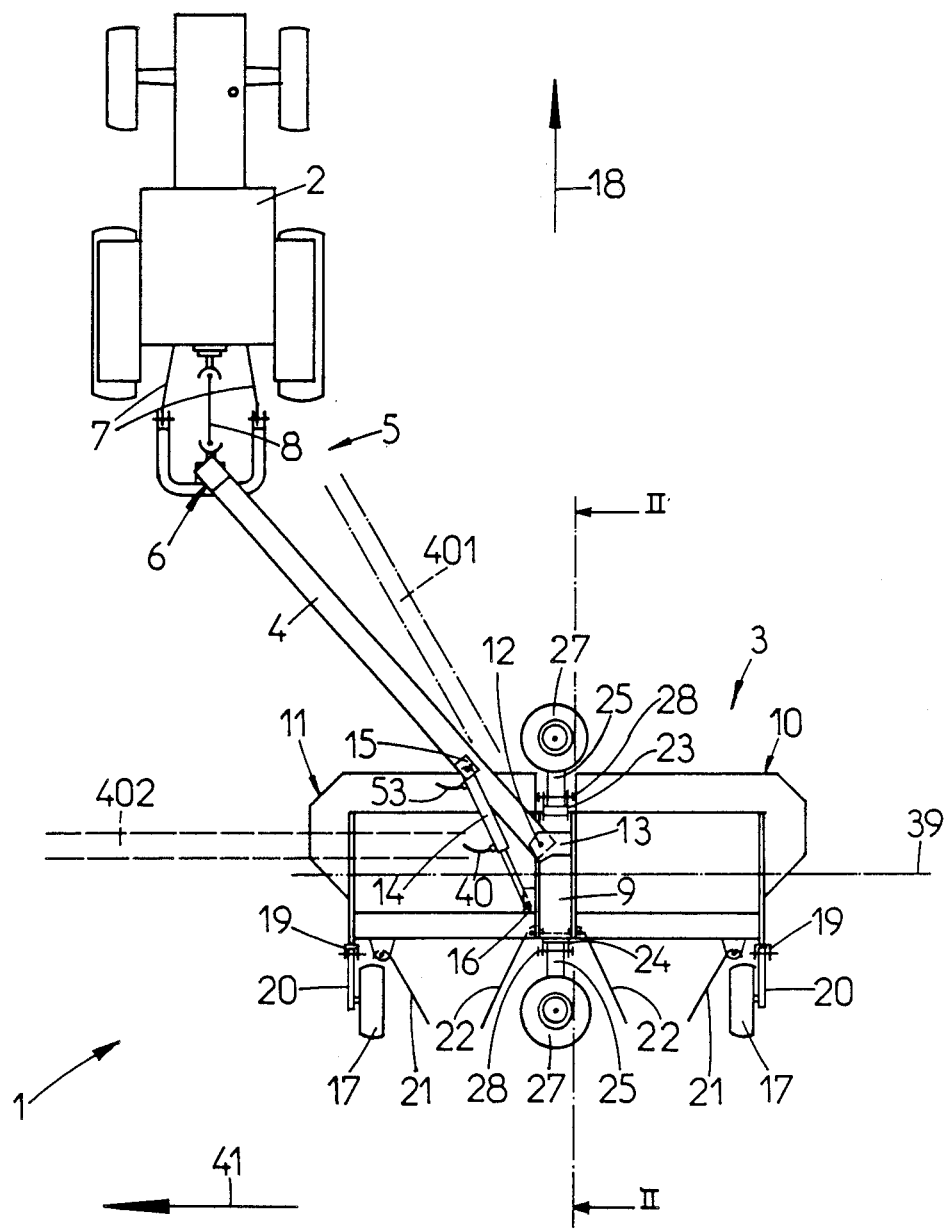
FIG. 1 shows a top view of a harvesting machine according to the invention using a transformation process to bring it from a working position to a transport position.

The harvesting machine 1 according to the invention, shown in FIG. 1, is hitched to a tractor 2 during operation and transport. It is made up of a body 3 and a tongue 4. At its front part 5 the tongue 4 is provided with a hitching and transmission device 6 known to those skilled in the art. This device 6 allows hitching of machine 1 to hitching system 7 of the tractor 2. The transmission device 6 transmits power from tractor 2 via a shaft with universal joints 8, to the elements for driving the working tools of machine 1.

Body 3 of machine 1 is made up of three main subassemblies: an intermediate structure 9 and two sets of working tools 10 and 11 located respectively at the sides of this intermediate structure 9.

At its back end, tongue 4 is connected to intermediate structure 9 by a joint whose axis 12 is directed upwardly. For this purpose, intermediate structure 9 has a clevis 13.

Thanks to this joint, tongue 4 can pivot in relation to intermediate structure 9 so that it can take different positions in relation to intermediate structure 9. As shown in solid lines in FIG. 1, tongue 4 is in a working position. It is shown in another possible working position 401 in chain lines, and it is shown in a transport position 402 in dashed lines.

The position of tongue 4 in relation to intermediate structure 9 is determined by extensible and retractable means such as hydraulic jack 14, for example. To do this, one of the ends of hydraulic jack 14 is mounted in a hinged manner on tongue 4 which for this purpose includes a clevis 15, while the other end of said hydraulic jack 14 is mounted in a hinged manner on body 3 of machine 1, which also has a clevis 16 for this purpose.

During operation, body 3 of machine 1 rests on the ground by means of two working wheels 17. These working wheels 17 extend behind body 3 when considering the direction of advance 18 during operation. To do this, at the back of its free end, each set of working tools 10 and 11 has a clevis 19 in which is hinged a suspension arm 20 on whose free end is fastened the corresponding working wheel 17. Thanks to these joints, the position of each wheel 17 can be modified in relation to the corresponding set of working tools 10 and 11. This makes it possible to modify the position of body 3 of machine 1 in relation to the ground.

Each group of working tools 10 and 11 further has harvest guide members 21 and 22.

At the front and back thereof, intermediate structure 9 has a clevis 23 and 24 in each of which is hinged an arm 25 around a pin 26 (see FIG. 2) directed crosswise to the direction of advance 18. At its free end, each arm 25 is provided with a transport wheel 27. In FIG. 1, machine 1 is in a working position in which transport wheels 27 do not touch the ground and are kept in this position thanks to a bolt 28 which extends through arm 25, and the clevis bolt 28 prevents the rotation of arm 25 in the clevises 23 and 24. During operation, transport wheels 27 are in a position in which they do not interfere with the harvesting operation. Actually, at the rear, transport wheel 27 extends between two harvest guide members 22, while at the front, transport wheel 27 extends relatively forward from the working zone of the tools of machine 1.

FIG. 2 shows a side view in section of body 3 of machine 1. Harvest guide members 21 and 22 have been removed for better understanding. In this FIGURE, it is seen that machine 1, in the example described, is a mower-conditioner. Actually, it can be seen that the working tools consist of cutting heads 29 and grabbing and conditioning tools 30.

In this FIGURE are also seen working wheels 17 and transport wheels 27. In regard to working wheels 17 it can be seen that the end of suspension arm 20 opposite wheel 17 enters into clevis 19 which extends to the lower part of body 3 of machine 1. Between suspension arm 20 and said body 3 extends an extensible and retractable device such as a hydraulic jack 31. As mentioned above, transport wheels 27 are kept in a rest position by a bolt 28 that goes all the way through clevis 23 or 24 and arm 25. For this purpose, clevises 23 and 24 each have a hole 33. These clevises 23 and 24 also have a second hole 34 into which bolt 28 will be introduced to hold transport wheels 27 in transport position. Clevises 23 and 24 in addition have high stops 35 and low stops 36. Thanks to these latter, it is relatively easy for the operator to raise or lower transport wheels 27. Actually, when arm 25 abuts high stop 35 or low stop 36, bolt 28 can easily be introduced into the corresponding holes.

As can be seen in FIG. 1, the length of body 3 of machine 1 measured in a direction crosswise to working direction 18 is greater than the width of body 3 of machine 1 measured in working direction 18. Generally this length is so great that it is almost impossible to transport machine 1 parallel to working direction 18. On the other hand, the width is generally less than the maximum widths allowed for road transport. Therefore it is advantageous to transport machine 1 so that the longest side of its body 3 extends parallel to the direction of transport. To do this, machine 1 must undergo a transformation.

FIGS. 3 to 7 show the transformation of machine 1 to bring it from the operating position to the transport position.

The first step is shown in FIG. 3. It consists in lifting body 3 of machine 1 to bring it to a raised position. To do this, oil is injected into hydraulic jacks 31 by lines 37 so that the jacks will extend. By extending, they produce the rotation of suspension arms 20 in clevises 19. Since working wheels 17 remain in contact with ground 32, this rotation of suspension arms 20 in clevises 19 causes lifting of body 3 off of ground 32.

When body 3 of machine 1 is in the desired raised position, as shown in FIG. 3, the second step, shown in FIG. 4, is started. It consists in bringing transport wheels 27 into transport position. To do this, bolts 28 are removed from holes 33 and wheels 27 are pivoted around pins 26 to bring them to the lowered position. When arms 25 are in contact with low stops 36, bolts 28 are introduced into holes 34 which has the effect of holding transport wheels 27 in the transport position. It will be noted that this step is feasible because transport wheels 27 are not yet in contact with ground 32.

Figure 5:
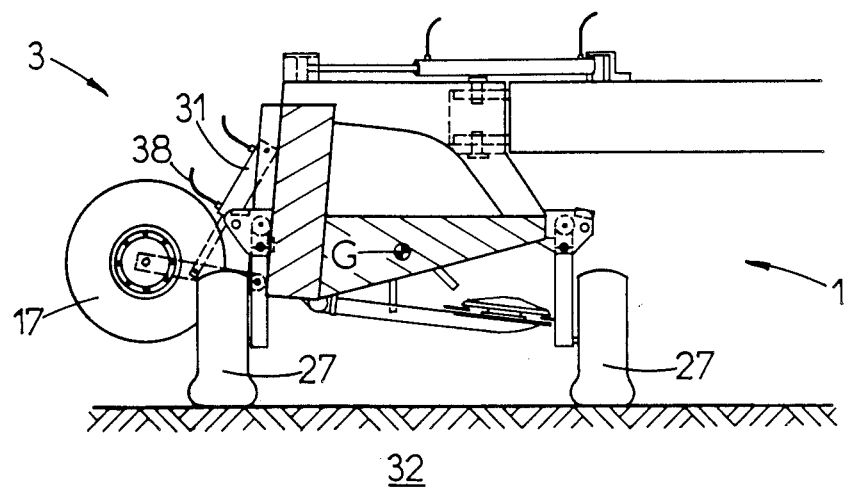
FIG. 5 shows the third step of the transformation process of the machine according to the invention.

After transport wheels 27 have been lowered, the third step, shown in FIG. 5, is started. It consists in transferring at least a part of the weight of machine 1 from working wheels 17 to transport wheels 27. To do this, oil is injected into hydraulic jacks 31 by lines 38 so that the jacks are shortened. During shortening of hydraulic jacks 31, transport wheels 27 approach ground 32. When transport wheels 27 touch ground 32, they will then support at least a part of the weight of machine 1. With shortening of jacks 31 continuing, working wheels 17 are then lifted off of ground 32 to bring them to a raised position in which they no longer hamper transport. As can be seen, transport wheels 27 turn, during transport, in planes of rotation approximately parallel to longitudinal axis 39 (see FIG. 1) of body 3 of machine 1. It will be noted that center of gravity (G) of body 3 (FIG. 5) is relatively close to ground 32. Since transport wheels 27 are approximately symmetrically spaced about axis 39 on both sides of body 3 of machine 1, they are relatively uniformly loaded. The above increases the stability of machine 1 during transport.

Then the fourth step (FIG. 6) is started. It consists in making tongue 4 pivot in relation to body 3 of machine 1 around pin 12 to bring it to a transport position 402 in which tongue 4 extends crosswise to working direction 18 and advantageously approximately parallel to longitudinal axis 39 of body 3 of machine 1. To do this, oil is injected into hydraulic jack 14 by line 40. This has the effect of shortening hydraulic jack 14. Shortening of hydraulic jack 14 causes the desired relative pivoting between tongue 4 and body 3 of machine 1 around pin 12. During this operation, front 5 of tongue 4 can remain hitched to tractor 2. The relative pivoting between tongue 4 and body 3 of machine 1 causes the rotation of body 3 of machine 1 around pin 12. This is possible because body 3 of machine 1 rests on ground 32 by transport wheels 27 and therefore can travel on ground 32.

After this fourth step, machine 1 is in transport position in which it will move in a direction 41 approximately parallel to its longitudinal axis 39. In this position, the movement of machine 1 is easier and its transport on the road becomes possible.

Figure 6:
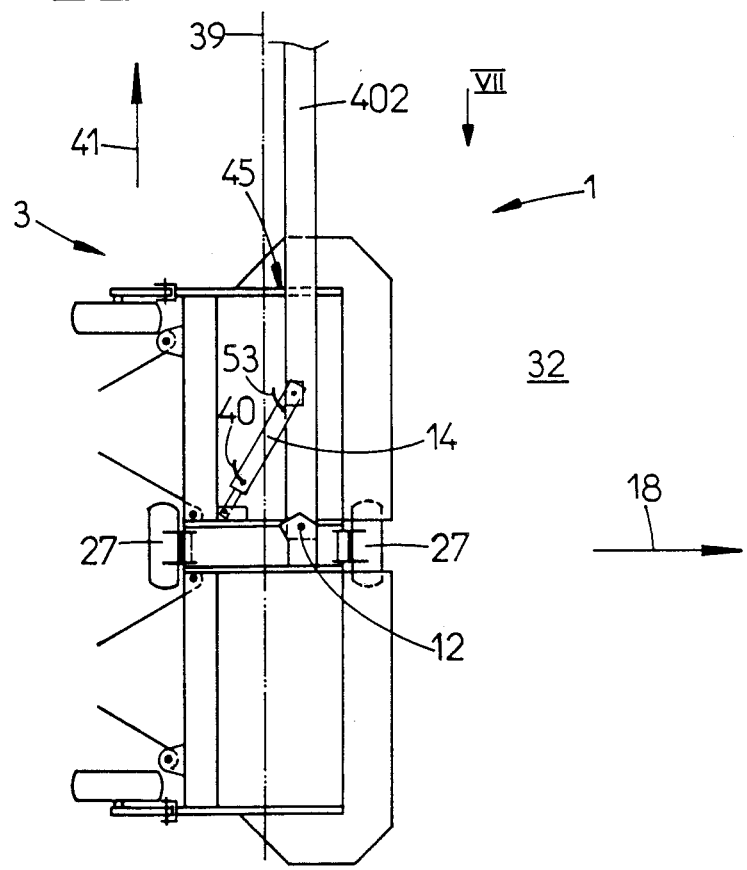
FIG. 6 shows the fourth step of the transformation process of the machine according to the invention.

FIG. 7 shows the machine according to arrow VII (see FIG. 6). Tongue 4 is in transport position 402. To avoid swaying of body 3 of machine 1 during transport, an additional connecting element 42 is provided which acts between body 3 of machine 1 and tongue 4. In the example of FIG. 7, this additional connecting element 42 consists of a tie rod whose length is variable and adjustable. On the one hand, this tie rod 42 is fastened to body 3 of machine 1 which for this purpose has a clevis 43 and, on the other hand, to tongue 4 which has a clevis 44. Clevises 43 and 44 are positioned in zone 45 (see FIG. 6). Thus, when tongue 4 has been put in transport position, the operator can put tie rod 42 in place and thus, as said above, avoid any risks of damage of clevis 13.

FIG. 8 shows another embodiment with an additional connecting means 42a. This latter is formed by a clevis 46 which is fastened in zone 45 on body 3 of machine 1. This clevis 46 is open toward the front in working direction 18. At the front, its wings 47 and 48 are diverging to facilitate introduction of tongue 4. Thus, when tongue 4 is brought to transport position 402 by hydraulic jack 14, it penetrates at the end of travel between the two wings 47 and 48 of clevis 46. It is thus tied in an additional way to body 3 of machine 1 which will avoid any swaying of body 3 of machine 1. It will be noted that in this embodiment, the additional connection, during transport, between tongue 4 and body 3 of machine 1 will be automatically made. It will also be noted that when being put into working or operating position from the transport position, tongue 4 can also, thanks to clevis 46, be automatically disconnected from additional connecting means 42a.

While in the embodiment that has just been described, transport wheels 27 are manually brought to the lowered transport position or to the raised rest position by the operator, in the embodiment of FIGS. 9 and 10, this operation is performed automatically thanks to extensible and retractable means such as hydraulic jack 49. This hydraulic jack 49 acts between arms 25 which for this purpose has two arm extensions 50. In FIG. 9, transport wheels 27 are in a raised rest position. Line 51 of hydraulic jack 49 is under pressure, which has a tendency to shorten the length of jack 49 which then flattens arms 25 supporting transport wheels 27 against upper stops 35 and holds said wheels 27 in this position. To make the transport wheels 27 pivot to the lowered transport position, the oil pressure in line 51 is released and oil is injected in jack 49 by line 52. This has the effect of lengthening hydraulic jack 49. By lengthening, the jack pushes on arm extensions 50 and forces the arm 25-transport wheel 27 units to pivot around respective pin 26 of clevises 23 and 24. When arms 25 touch low stop 36, transport wheels 27 are then in the desired position. Since the pressure in line 52 of jack 49 is maintained, transport wheels 27 are kept in their position.

It will be noted that to lift transport wheels 27 it suffices to release the oil pressure in line 52 and inject oil into jack 49 by line 51. Jack 49 is then shortened and makes the arm 25-transport wheel 27 units pivot upward until arms 25 touch high stops 35.

Whereas the process for transformation of a harvesting machine according to the invention to bring it from a working position to a transport position was explained in the light of FIGS. 3 to 7, it will be understood that to bring this machine from the transport position to the working position, the various operations will be performed in the opposite way. Thus, additional connecting means 42, 42a are disconnected and tongue 4 will be made to pivot to working position by injecting oil in hydraulic jack 14 by line 53, then oil will be injected in hydraulic jacks 31 by lines 37 to make working wheels 17 go down, then transport wheels 27 will be lifted to their raised rest position, and finally, body 3 of machine 1 will be lowered to bring working tools 29 and 30 to working position.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A crop harvesting machine displaceable on a ground, said crop harvesting machine comprising:
   (a) a body having working tools and a structure supporting said working tools, said body further having a longitudinal axis and a vertical middle plane extending at least approximately parallel to a working direction;
   (b) two spaced apart first wheels extending when considering said working direction behind said working tools and connected to said structure by means permitting a modification of the vertical position of said first wheels in relation to said body, said first wheels being in contact with said ground during working in order to support said body during working;

(c) first means for controlling said modification of the vertical position of said first wheels in relation to said body;

(d) two spaced apart second wheels separate from said first wheels and being in contact with said ground during transport in order to support said body during transport, said second wheels extending at least approximately in the vicinity of said vertical middle plane of said body and being, when considering said working direction, connected to said structure in such a manner that one of said second wheels is connected to a front part of said structure and the other of said second wheels is connected to a rear part of said structure, and in such a manner as to be able to be brought from a rest position off the ground to a transport position where said second wheels are in contact with said ground;

(e) a tongue connected to said structure by a joint having an upwardly directed axis, whereby said tongue is able to pivot in relation to said body between at least one working position and a transport position, and whereby said longitudinal axis of said body extends crosswise to said working direction during working and at least approximately parallel to a transport direction during transport, said joint extending at least approximately in the vicinity of said vertical middle plane of said body;

(f) second means for positively moving said tongue between said at least one working position and said transport position; and (g) means acting between said body and said tongue at a position spaced from said joint for additionally connecting said tongue to said body when said tongue is in said transport position, said additional connecting means preventing swaying of said body during transport.

2. The crop harvesting machine according to claim 1, wherein said additional connecting means extend in the vicinity of an extremity of said body to which said tongue is pivoted to be brought in said transport position.

3. The crop harvesting machine according to claim 1, wherein said additional connecting means include means for automatic attachment of said tongue to said body when said tongue is in said transport position.

4. The crop harvesting machine according to claim 1, wherein said additional connecting means include means for automatic attachment of said tongue to said body when said tongue is moved in said transport position.

5. The crop harvesting machine according to claim 1, wherein said additional connecting means include means for automatic detachment of said tongue from said body when said tongue is in said transport position.

6. The crop harvesting machine according to claim 1, wherein said additional connecting means include means for automatic detachment of said tongue from said body when said tongue is moved out of said transport position.

7. The crop harvesting machine according to claim 1, wherein said additional connecting means connect said tongue to said structure.

8. The crop harvesting machine according to claim 1, wherein each of said second wheels is connected to said structure by a pivot pin.

9. The crop harvesting machine according to claim 8, wherein said pivot pin is at least approximately horizontal and extends at least approximately parallel to said longitudinal axis.

10. The crop harvesting machine according to claim 1, including first stop means defining said transport position of said second wheels.

11. The crop harvesting machine according to claim 1, including second stop means defining said rest position of said second wheels.

12. The crop harvesting machine according to claim 1, including third means for positively moving said second wheels between said transport position and said rest position.

13. The crop harvesting machine according to claim 12, wherein said third means for positively moving said second wheels between said transport position and said rest position is an hydraulic jack means.

14. The crop harvesting machine according to claim 1, wherein said second wheels are connected to said structure such that said working tools do not interfere with said second wheels in said transport position.

15. The crop harvesting machine according to claim 1, wherein said second wheels are connected to said structure such that during working when said second wheels are in said rest position, said second wheels do not hinder said working.

16. The crop harvesting machine according to claim 1, wherein said second means for positively moving said tongue is an hydraulic jack means.

17. The crop harvesting machine according to claim 1, wherein said tongue is connected to said intermediate structure.

18. The crop harvesting machine according to claim 1, wherein said working tools includes mowing means.

19. The crop harvesting machine according to claim 18, wherein said working tools further includes conditioning means.

20. The crop harvesting machine according to claim 1, wherein said additional connecting means is attached to said body and engages said tongue.

21. The crop harvesting machine according to claim 1, wherein said structure comprises an intermediate structure and said working tools extending, as seen in plan, on both sides of said intermediate structure.

22. The crop harvesting machine according to claim 21, wherein each one of said second wheels is connected to said intermediate structure.

* * * * *